May 10, 1932.  P. DE MARTINI, JR  1,857,712
TABLE ACCESSORY
Filed Jan. 13, 1931  2 Sheets-Sheet 1

Inventor.
Paul De Martini, Jr.
By Clarence A. O'Brien
Attorney

May 10, 1932.  P. DE MARTINI, JR  1,857,712
TABLE ACCESSORY
Filed Jan. 13, 1931    2 Sheets-Sheet 2
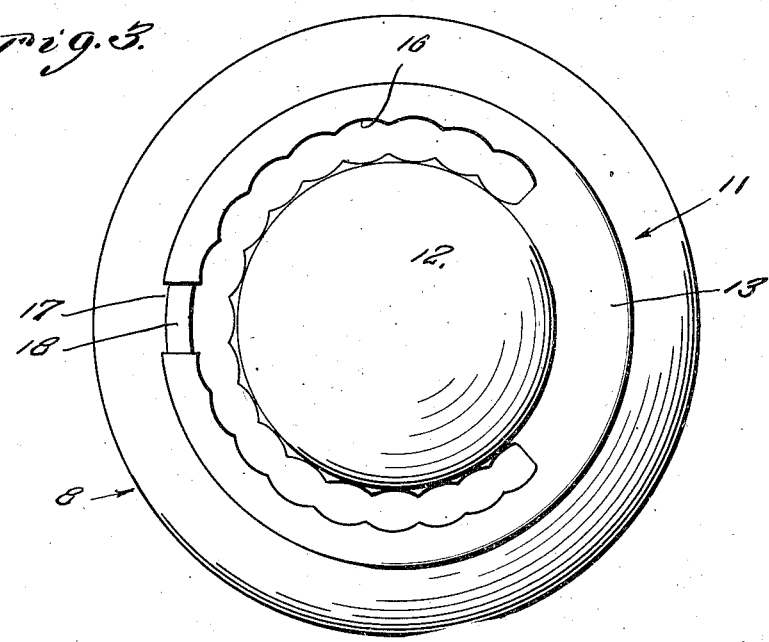
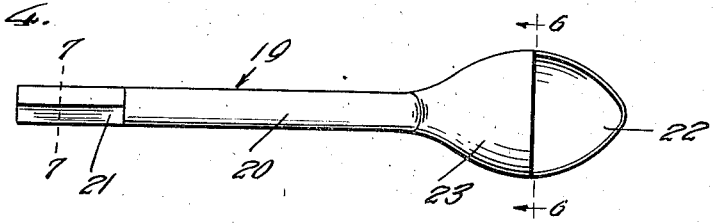
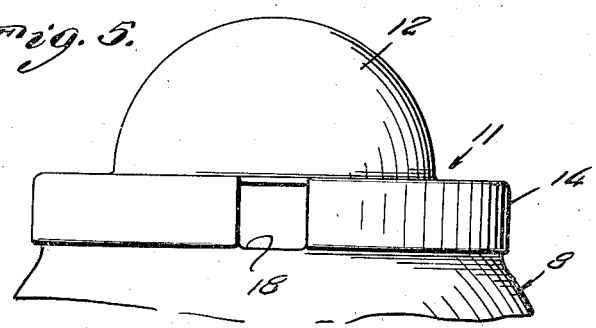
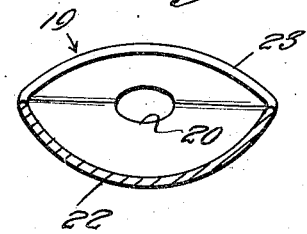
Inventor
Paul De Martini, Jr.
By Clarence A. O'Brien
Attorney Patented May 10, 1932

1,857,712

UNITED STATES PATENT OFFICE

PAUL DE MARTINI, JR., OF SAN FRANCISCO, CALIFORNIA

TABLE ACCESSORY

Application filed January 13, 1931. Serial No. 508,530.

This invention relates to an improved combination appliance or accessory for table use; which may be referred to as a sugar bowl and spoon.

The primary feature of the invention is embodied in the provision of a unique sugar spoon adapted for scooping and delivering the sugar from the bowl into a cup or the like without removing the spoon from the bowl.

A purpose of the invention is to provide an arrangement of this kind wherein the spoon is attached to the bowl by a novel cover structure, whereby to prevent accidental removal of the spoon from the sugar-bowl. In this connection I would state that it is a matter of common knowledge that in using appliances of this class in lunchrooms and restaurants, it is not unusual for customers to inadvertently lift the sugar spoon from the bowl and to use it for stirring tea, coffee and the like. Sometimes the spoon is replaced while wet, and the sugar in the bowl sticks to the spoon, thus interfering with its effectiveness and making it unsanitary and repulsive in appearance to fastidious customers.

It follows that the principal purpose of the present invention is to provide an unusual type of a spoon which is substantially fastened to the sugar bowl and is yet so constructed as to permit it to be employed for elevating and then discharging sugar by gravity into a cup or desired receptacle.

These features and advantages are accomplished through the use of a novel cover which serves as a fastener for the spoon and which also serves as a shield to minimize the accumulation of extraneous matter, dust, dirt and the like in the sugarbowl.

The characteristic feature of the invention however, is the special spoon whose ladle portion is formed with a guard which functions somewhat as a funnel and co-operates with the hollow tubular handle which in action constitutes a gravity chute for delivering the sugar freely into a cup or the like.

In the drawings:

Figure 3 is a top plan view with the spoon removed.

Figure 4 is a plan view of the spoon per se.

Figure 5 is a fragmentary elevational view with the spoon removed.

Figures 6 and 7 are cross sections on the lines 6—6 and 7—7 respectively of Figure 4.

Figure 1:
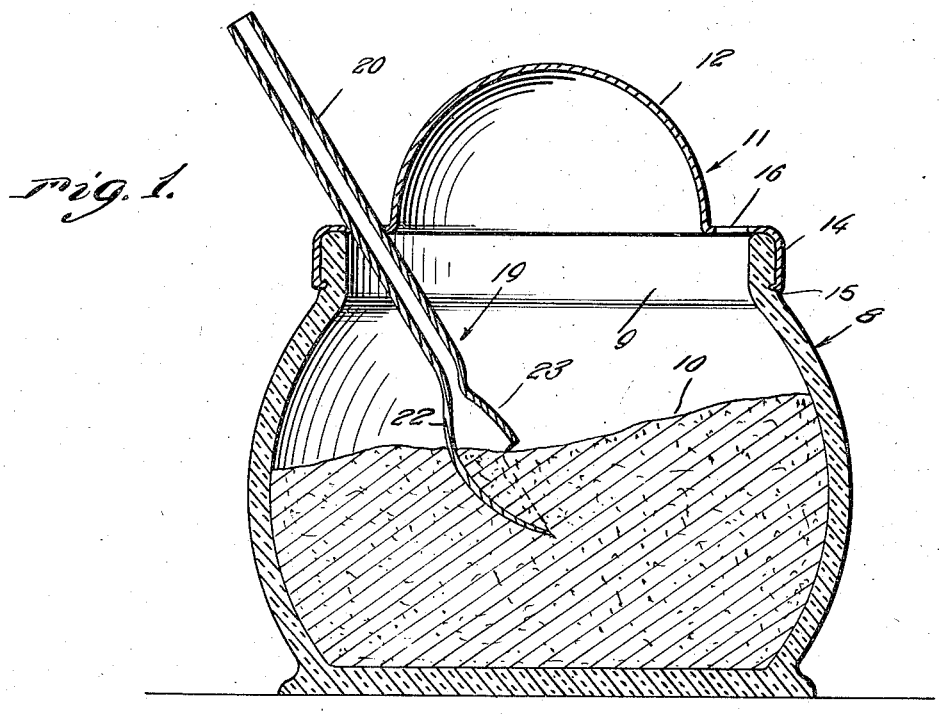
Figure 1 is a view in section showing the complete assembly with the spoon fastened to the sugarbowl.

In the drawings, in Figure 1, the numeral 8 designates the sugarbowl. This is preferably a flat bottom globular body formed at its open top with an upstanding annular neck 9. The bowl is preferably constructed of transparent material such as glass so that the sugar contained on the interior may be clearly observed by the user.

The numeral 11 designates the cover or lid. This comprises a centrally disposed dome-like clearance portion 12 and a surrounding annulus 13 formed with a depending flange or rim 14 having an inturned lip 15 fitting into a keepergroove provided in the neck 9. The portion 13 is formed with an arcuate slot 16 whose edges are serrated for ornamental purposes. The serrations also serve for agitating the spoon when desired for loosening the sugar, when the sugar becomes packed.

At its intermediate portion this slot 16 registers with a cut-out portion 17 which in turn registers with a notch 18 formed in the neck 9. This notch constitutes a keeper seat. The spoon is generally denoted by the numeral 19 and comprises a tubular hollow handle 20 having its outer end of polygonal external configuration as indicated at 21 to form a convenient fingergrip. The bowl or ladle portion 22 is of customary configuration and is formed integral with an overlying topping shield or guard 23 which co-operates with the ladle in forming a sort of a funnel. This funnel registers with the passage through the handle as shown in Figure 2.

Figure 2:
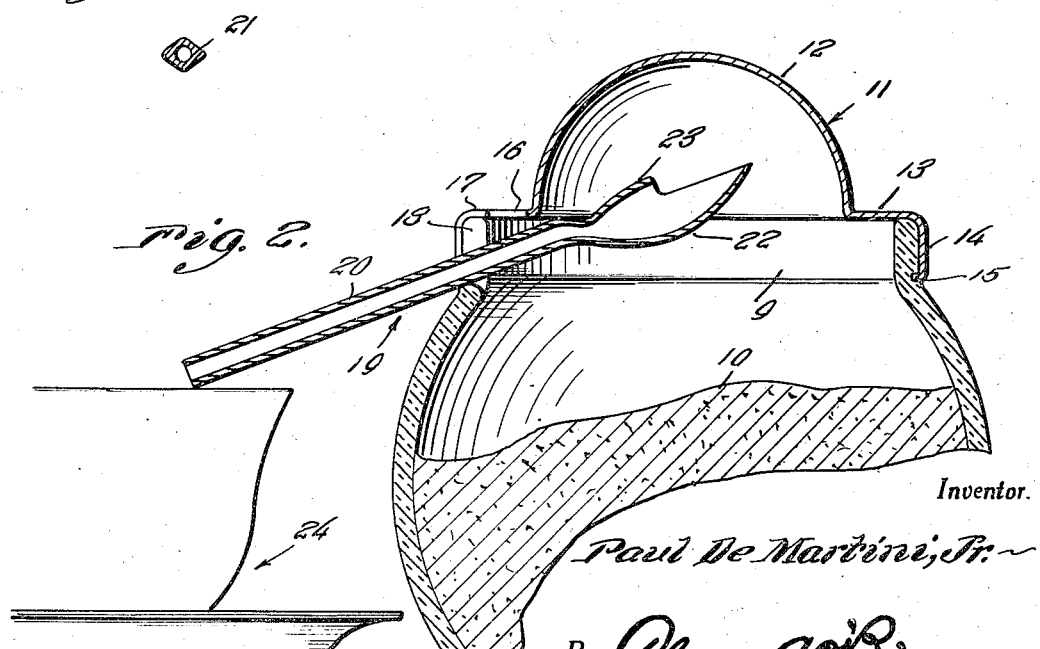
Figure 2 is a view similar to Figure 1 showing the manner in which the device is used.

In practice, the spoon is arranged in the bowl as shown in Figures 1 and 2. Its normal position is as presented in Figure 1, at which time the ladle may be submerged in the sugar to lift the desired portion. Then, the handle portion 20 is moved around and seated in the notch or keeper seat 18 so that it can be rocked to the inclined state shown in Figure 2. At this time the sugar gravitates down into the tubular passage in the handle where it may be discharged into the cup or other receptacle generally represented by the numeral 24.

It is obvious that the dome-like portion 12 provides the desired clearance for movement of the inner portion of the spoon. Moreover the slot in the cover permits the spoon to be shifted around in a sort of a circumferential manner for loosening the sugar when the sugar becomes packed. The sugar is visible through the transparent bowl and can be shifted, or the spoon can be shifted to scoop up the sugar as is most convenient to the user.

Particularly do I wish to emphasize the snap-on cover which is ornamental and also useful as providing a retainer for preventing undesired withdrawal of the spoon from the sugarbowl. The cover is also a sanitary feature and is such in configuration and arrangement as to not interfere with expeditious manipulation of the spoon scooping and discharging the sugar.

The transparency of the bowl 8 to permit inspection of the sugar on the interior is an important feature in that it aids in permitting sinking of the spoon into the sugar at a most advantageous point. One of the features of the invention however is the keeper seat which provides the desired fulcrum for the hollow handled spoon, as well as the spoon itself which is formed with the funnel-like portion at its inner end and the tubular handle to facilitate gravitation and convenient discharge of the sugar in the cup.

It is thought that the description taken in connection with the drawings will enable a clear understanding of the invention to be had. Therefore, a more lengthy description is thought unnecessary.

While the preferred embodiment of the invention has been shown and described, minor changes coming within the field of invention may be resorted to if desired.

I claim:

1. In a structural assembly of the class described, in combination, a sugar bowl including a transparent body portion open at its top and provided with a neck formed at a predetermined point with a vertical notch, a cover secured to said neck having a dome-shaped portion and provided with a notch in registry with said first named notch, said first named notch extending a substantial distance below the dome-shaped portion of said cover and a spoon including a hollow tubular handle freely passing through said registering notches and having the outer portion thereof free for manual engagement, the inner portion of the spoon being formed with a scoop in feeding relation to said tubular handle.

2. In a structural assembly of the class described, in combination, a sugar bowl including a transparent body portion open at its top and provided around said opening with an upstanding circular neck formed with a notch, a cover having a dome-shaped portion and a rim attached to said neck, said rim being formed with a notch in registry with said first named notch, said first-named notch extending a substantial distance below the dome-shaped portion of said cover, said rim being further provided with an arcuate spoon adjusting slot communicating with the notch therein, and a spoon comprising an open-ended hollow handle adapted to be seated in said registering notches, and formed on its inner end with a collecting receptacle including a conventional ovoid shallow ladle and an associated web-like shield, said shield and ladle forming a funnel in registration with the inner intake end of said handle.

3. As a new product of manufacture, a sugar bowl including a transparent body portion of general globular configuration open at its top and formed with a surrounding ring-like neck provided with a notch constituting a keeper seat, a cover embodying a centralized dome-like portion and an outstanding annular part provided with a depending annular ring releasably engaged with said neck, said rim being provided with a notch in registry with said first named notch and said annular portion being also provided with an arcuate slot having its edges serrated.

In testimony whereof I affix my signature.

PAUL DE MARTINI, Jr.